(12) United States Patent
Kato et al.

(10) Patent No.: US 8,155,855 B2
(45) Date of Patent: Apr. 10, 2012

(54) VEHICLE MOTION CONTROL APPARATUS

(75) Inventors: Toshihisa Kato, Handa (JP); Atsushi Ikematsu, Kariya (JP)

(73) Assignee: Advics Co., Ltd., Kariya, Achi-Pref. (JP)

( * ) Notice: Subject to any disclaimer, the term of this patent is extended or adjusted under 35 U.S.C. 154(b) by 1107 days.

(21) Appl. No.: 12/022,844

(22) Filed: Jan. 30, 2008

(65) Prior Publication Data
US 2008/0201052 A1 Aug. 21, 2008

(30) Foreign Application Priority Data

Feb. 1, 2007 (JP) ................................ 2007-023088

(51) Int. Cl.
*B60T 13/18* (2006.01)
*B60T 13/122* (2006.01)
(52) U.S. Cl. .......................... 701/93; 303/11
(58) Field of Classification Search ...................... 701/93
See application file for complete search history.

(56) References Cited

U.S. PATENT DOCUMENTS

| | | | | |
|---|---|---|---|---|
| 3,177,964 A | * | 4/1965 | Anderson ..................... 180/307 |
| 3,633,978 A | * | 1/1972 | Remillieux ................. 303/118.1 |
| 4,785,714 A | * | 11/1988 | Tamada et al. ................... 91/491 |
| 4,838,305 A | * | 6/1989 | Reinartz et al. .......... 137/505.13 |
| 4,907,408 A | * | 3/1990 | Barker ............................. 60/451 |
| 5,924,777 A | * | 7/1999 | Kamikado .................... 303/150 |
| 6,267,454 B1 | * | 7/2001 | Takahashi ..................... 303/9.71 |
| 2004/0262054 A1 | * | 12/2004 | Ishimaru et al. ............. 180/53.4 |
| 2006/0196709 A1 | * | 9/2006 | Ishimaru et al. ............. 180/53.4 |
| 2008/0007115 A1 | * | 1/2008 | Mizutani ..................... 303/113.2 |

FOREIGN PATENT DOCUMENTS

| | | |
|---|---|---|
| DE | 195 81 271 | 11/1996 |
| JP | 2000-203401 (A) | 7/2000 |
| JP | 2001301596 A | * 10/2001 |

OTHER PUBLICATIONS

Official Action dated May 31, 2011, issued by the German Patent Office in corresponding German Application No. 10 2008 000 195. 3-21, and English language translation of the Official Action.

* cited by examiner

*Primary Examiner* — Shelley Chen
(74) *Attorney, Agent, or Firm* — Buchanan Ingersoll & Rooney PC

(57) ABSTRACT

A vehicle motion control apparatus includes a motion controlling process operating a pump for supplying brake fluid between a pressure difference control valve and a pressure increasing control valve and controlling the pressure difference control valve and the pressure increasing control valve, thereby pressurizing the wheel cylinder of the wheel to be controlled, a control amount adjusting process reducing a control amount of a motor when a frictional coefficient of a road surface is small, a load judging process judging a load condition of the motor when determining to reduce the control amount of the motor, and a pressure difference controlling process reducing the pressure difference when the load of the motor is in a high load condition.

16 Claims, 11 Drawing Sheets

VEHICLE MOTION CONTROL APPARATUS

CROSS REFERENCE TO RELATED APPLICATIONS

This application is based on and claims priority under 35 U.S.C §119 with respect to Japanese Patent Application 2007-023088, filed on Feb. 1, 2007, the entire content of which is incorporated herein by reference.

FIELD OF THE INVENTION

This invention relates to a vehicle motion control apparatus controlling vehicle motion by controlling brake fluid pressure.

BACKGROUND

A vehicle brake control device is disclosed in JP 2000-203401A as a known motion control device. In the device, each pump supplies the brake fluid to generate brake fluid pressure, and the brake fluid pressure is supplied to wheel cylinders (hereinafter, referred to as W/C) for automatic pressurization. In each conduit connecting a master cylinder (hereinafter, referred to as M/C) and the W/Cs, a pressure difference control valve is disposed close to the M/C relative to a connecting point of the conduit connecting between an outlet port of each pump and the W/C. The pressure difference control valve is adjusted to generate a predetermined pressure difference in the conduit or to shut off the conduit. Additionally, the pressure increasing control valve(s), each controlling the pressure increase to the corresponding W/C of each wheel to be controlled (hereinafter, referred to as controlled wheel), is (are) controlled to be opened or closed by duty ratio, and the pressure increasing control valve corresponding to each non controlled wheel is closed. As a result of the movements of these valves, the pump suctions or discharges the brake fluid. Accordingly, the pump supplies the brake fluid to generate the brake fluid pressure, thereby pressurizing the W/C of each controlled wheel.

In this type of brake control device, the amount of the current supplied to the motor is controlled in order to reduce operating noise occurring when the pump discharges. For example, the amount of the current supplied to the motor, which drives the pumps, is controlled by duty ratio so as to be small when a frictional coefficient of a road surface is relatively small, compared to when the frictional coefficient is relatively large, thereby reducing the driving amount of the pump, i.e. the pump suction/discharge amount. Further, as the actual W/C pressure becomes closer to a target pressure, the amount of the current being supplied to the motor is limited to reduce the driving amount of the pump.

However, the pressure difference control valve of each controlled wheel is brought into a predetermined pressure difference generating state or a fluid communication interrupting state, and the pressure increasing control valve, which controls the pressure increase to the W/C of each non-controlled wheel, is closed for pressurizing the W/C of each controlled wheel. Thus, the brake fluid pressure becomes high around the outlet port of the pump. Therefore, when the pump suction/discharge amount is limited and the brake fluid pressure becomes high around the outlet port of the pump, the driving of the pump is restrained.

A need exists for a vehicle motion control apparatus which reduces operating noise in view of a load condition of a motor.

SUMMARY OF THE INVENTION

According to an aspect of the present invention, a vehicle motion control apparatus includes a motion controlling process operating a pump for supplying brake fluid between a pressure difference control valve, which is disposed between a master cylinder and a wheel cylinder provided corresponding to each wheel, and a pressure increasing control valve disposed between the pressure difference control valve and the wheel cylinder and corresponding to each wheel cylinder, the motion controlling process controlling the pressure difference control valve to generate a pressure difference between a master cylinder side and a wheel cylinder side to reach a commanded target pressure and controlling the pressure increasing control valve, thereby pressurizing the wheel cylinder corresponding to the wheel to be controlled, irrespective of a driver's brake operation, a control amount adjusting process reducing a control amount of a motor driving the pump when a frictional coefficient of a road surface is smaller than a predetermined value, a load judging process judging a load condition of the motor when determining to reduce the control amount of the motor, and a pressure difference controlling process reducing the pressure difference generated by the pressure difference control valve when the load imposed on the motor is in a high load condition, compared to when the load imposed on the motor is not in the high load condition.

A vehicle motion control apparatus includes a motion controlling process operating a pump for supplying brake fluid between a pressure difference control valve, which is disposed between a master cylinder and a wheel cylinder provided corresponding to each wheel, and a pressure increasing control valve disposed between the pressure difference control valve and the wheel cylinder and corresponding to each wheel cylinder, the motion controlling process controlling the pressure difference control valve to generate a pressure difference between a master cylinder side and a wheel cylinder side to reach a commanded target pressure and controlling the pressure increasing control valve, thereby pressurizing the wheel cylinder corresponding to the wheel to be controlled, irrespective of a driver's brake operation, a control amount adjusting process reducing a control amount of a motor driving the pump when a frictional coefficient of a road surface is smaller than a predetermined value, a load judging process judging a load condition of the motor when determining to reduce the control amount of the motor, and a pressure controlling process reducing the pressure difference generated by the pressure difference control valve when the load imposed on the motor is in a high load condition, compared to when the load imposed on the motor is not in the high load condition, and controlling the corresponding pressure increasing control valve of the wheel to be controlled, out of the pressure increasing control valves, to open, thereby pressurizing the wheel cylinder by the pressure difference generated only by the pressure difference control valve.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
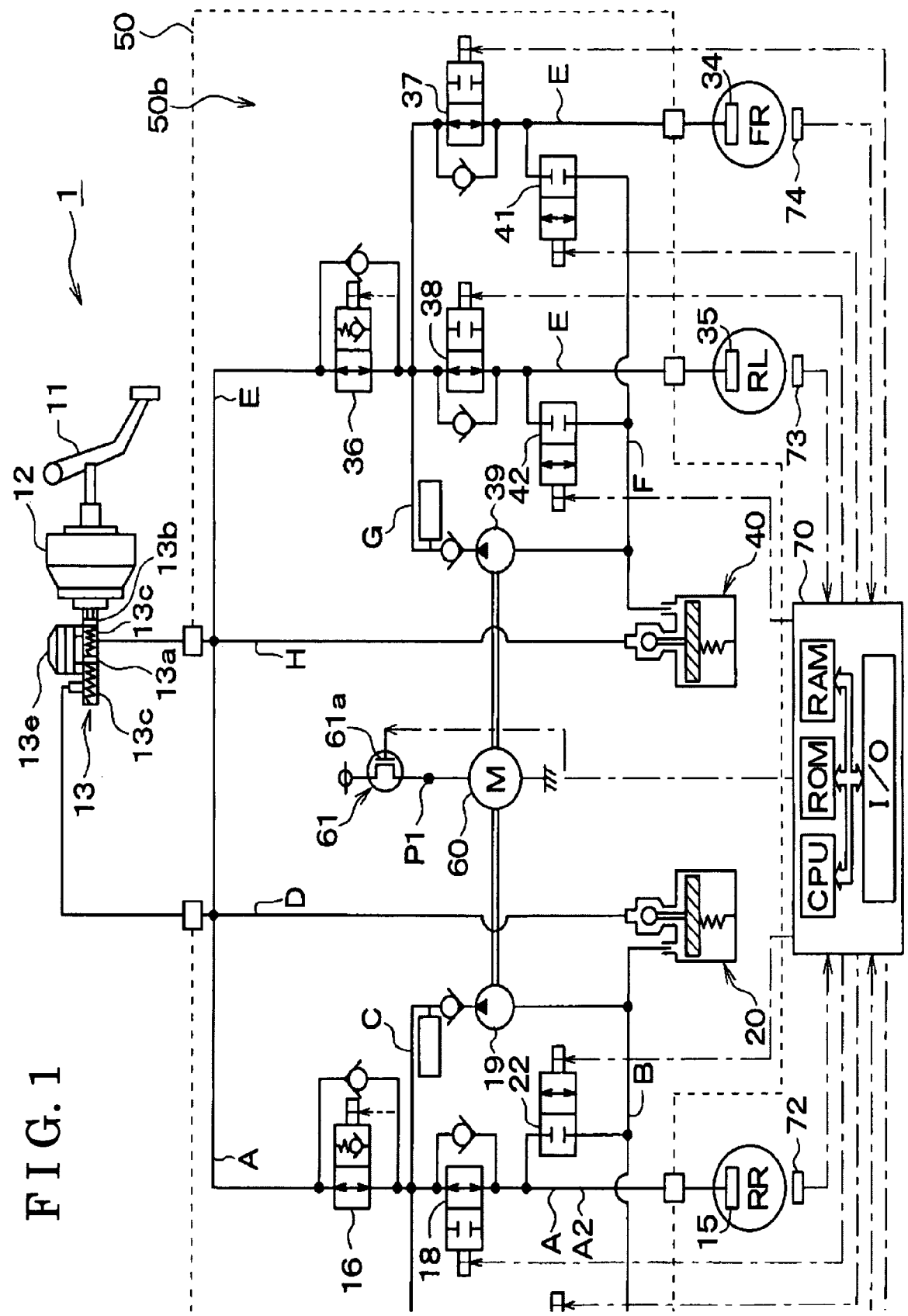
FIG. 1 is a diagram showing an entire configuration of a brake control system achieving vehicle motion control in a first embodiment of the invention.

Hereinafter, plural embodiments of the present invention will be described with reference to the attached drawings. In the respective embodiment, the same reference numerals are used in the drawings to represent identical or equivalent elements.

First Embodiment

A first embodiment of the invention will be described here. FIG. 1 illustrates an entire configuration of a vehicle brake control system 1 for achieving vehicle motion control according to the first embodiment of the invention. In the embodiment, electronic stability control (hereinafter referred to as ESC) is implemented as a vehicle motion control.

In FIG. 1, when a driver depresses the brake pedal 11, the depression force is boosted by a booster 12, and master pistons 13a and 13b provided in a M/C 13 are pressed by the boosted depression force. Accordingly, equal M/C pressure is generated in each of a primary chamber 13c and a secondary chamber 13d, both of which are defined in the M/C 13 by means of master pistons 13a and 13b. The M/C pressure is applied to each of W/Cs 14, 15, 34 and 35 through a brake fluid pressure controlling actuator 50.

Here, the M/C 13 is provided with a master reservoir 13e having passages for communicating with the primary chamber 13c and the secondary chamber 13d.

The brake fluid pressure controlling actuator 50 includes a first brake circuit 50a and a second brake circuit 50b. The first brake circuit 50a controls the brake fluid pressure for a front-left wheel FL and a rear-right wheel RR and the second brake circuit 50b controls the brake fluid pressure for a front-right wheel FR and a rear-left wheel RL.

Since the second brake circuit 50b has a configuration identical to the first brake circuit 50a, only the first brake circuit 50a will be described and the description of the second brake circuit 50b will be omitted.

The first brake circuit 50a is provided with a conduit A serving as a main conduit for transmitting the M/C pressure to the W/C 14 for the front-left wheel FL and the W/C 15 for the rear-right wheel RR.

Further, the conduit A is provided with a first pressure difference control valve 16 which is controlled to be in a fluid communicating state, in a pressure difference generating state or in a fluid communication interrupting state. Specifically, when the first pressure difference control valve 16 is in the fluid communicating state, flow of the brake fluid in the conduit A is established, or fluid communication is established between the M/C 13 and the W/Cs 14 and 15. When the first pressure difference control valve 16 is in the pressure difference generating state, the pressure difference is generated between the M/C pressure and the W/C pressure of each of the W/Cs 14 and 15. When the first pressure difference control valve 16 is in the fluid communication interrupting state, the flow of the brake fluid in the conduit A is interrupted by closing the first pressure difference control valve 16, or the fluid communication is interrupted between the M/C 13 and the W/Cs 14 and 15 by the first pressure difference control valve 16. The pressure difference control valve 16 is a normally opened linear solenoid valve, and the commanded current, which has a predetermined relationship with a desired commanded pressure difference, is flowed thereinto for adjusting the actual pressure difference between the master cylinder 13 and the corresponding wheel cylinder(s) 14 and 15 in accordance with the commanded target pressure. When the commanded target pressure is larger than the actual pressure difference, the current is flowed into the pressure difference control valve 16 to move the valve 16 in a closing direction for the amount corresponding to the commanded current, thereby increasing the actual pressure difference to reach the commanded target pressure. On the other hand, when the commanded target pressure is smaller than the actual pressure difference, the current is flowed into the valve 16 to move the valve 16 in an opening direction for the amount corresponding to the commanded current, thereby decreasing the actual pressure difference to reach the commanded target pressure. The openings or closures of the first pressure difference control valve 16 is adjusted so as to be in the fluid communicating state at the time of the normal brake operation in which a driver operates a brake pedal 11 (the motion control is not operated). When the current flows into a solenoid coil provided at the first pressure difference control valve 16, the openings or closures of the first pressure difference control valve is adjusted to generate the pressure difference. In the case, the larger the amount of the current flowed into the solenoid coil becomes, the larger the pressure difference becomes.

When the first pressure difference control valve 16 is in the pressure difference generating state, only if the brake fluid pressure of the W/C 14 and 15 becomes higher than the M/C pressure by a predetermined pressure, the brake fluid is allowed to flow from the W/Cs 14 and 15 toward the M/C 13. Thus, the brake fluid pressures at the sides of the W/C 14 and 15 are constantly maintained at a level lower than that of the M/C 13 side by the predetermined pressure.

The conduit A branches to a conduit A1 and a conduit A2 at the sides of W/C 14 and 15 which are located downstream of the first pressure difference control valve 16. The conduit A1 is provided with a first pressure increasing control valve 17 for controlling the increase in the brake fluid pressure applied to the W/C 14, and the conduit A2 is provided with a second pressure increasing control valve 18 for controlling the increase in the brake fluid pressure applied to the W/C 15.

The first and second pressure increasing control valves 17 and 18 are respectively comprised of a two-position solenoid valve which is switched from the fluid communicating state and the fluid communication interrupting state.

The first and second pressure increasing control valves 17 and 18 are normally open type valves. When no control current flows into the solenoid coils provided at the first and second pressure increasing control valves 17 and 18 (non energized state), each valve is in the fluid communicating state. On the other hand, when the control current flows into the solenoid coils (energized state), each valve is controlled to be in the fluid communication interrupting state.

A first pressure decreasing control valve 21 and a second pressure decreasing control valve 22 are disposed at a conduit B, which connects a portion of the conduit A1 between the first pressure increasing control valve 17 and the W/C 14 to the pressure regulation reservoir 20 and also connects a portion of the conduit A2 between the second pressure increasing control valve 18 and the W/C 15 to the pressure regulation reservoir 20. The conduit B functions as a pressure decreasing conduit. Each of the first and second pressure decreasing control valves 21 and 22 is comprised of a two position solenoid valve which is switched from the fluid communicating state and the fluid communication interrupting state. Further, the first and second pressure decreasing control valves 21 and 22 are normally closed type valves.

A conduit C serving as a reflux conduit is provided so as to connect the conduit A serving as the main conduit to the pressure regulation reservoir 20. At the conduit C, a self-suction pump 19 driven by a motor 60 is provided. The brake fluid is suctioned/discharged from the pressure regulation reservoir 20 toward the M/C 13 or the W/Cs 14 and 15 by the pump 19. The voltage supply to the motor 60 is controlled by switching on/off a semiconductor switch provided at a motor relay 61.

Further, a conduit D serving as an auxiliary conduit is provided between the pressure regulation reservoir 20 and the M/C 13. The pump 19 suctions the brake fluid from the M/C 13 through the conduit D and discharges the brake fluid to the conduit A, thereby supplying the brake fluid toward the W/Cs 14 and 15 to increase the W/C pressure of each controlled wheel at the time of the motion control such as ESC or Traction control (TCS).

Figure 2:
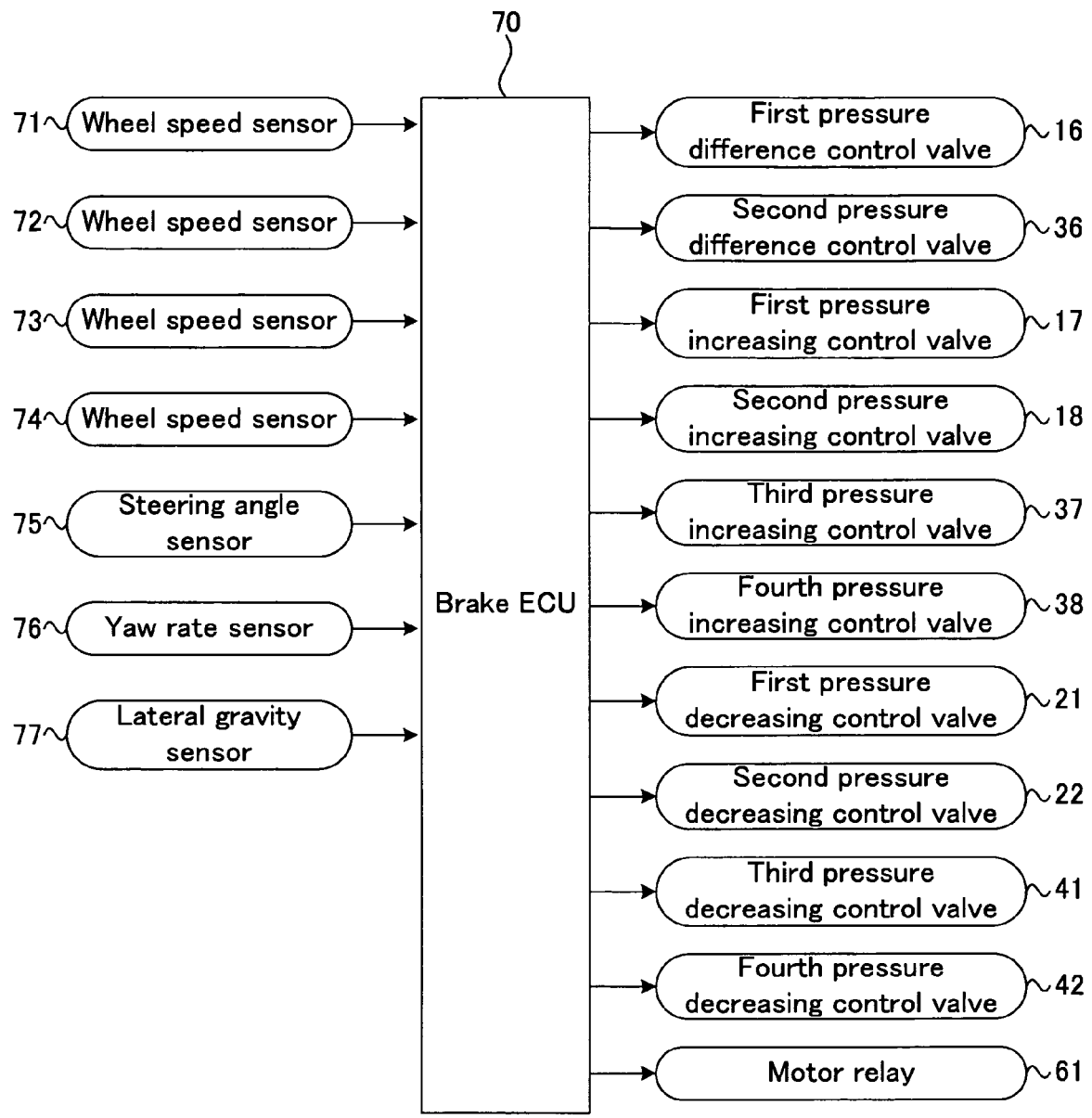
FIG. 2 is a block diagram showing a relationship between output and input signals of a brake ECU.

The brake ECU 70 corresponds to a vehicle motion control apparatus which controls the brake control system 1 of the embodiment and is comprised of a known microcomputer having a CPU, a ROM, a RAM, an I/O and the like. The brake ECU 70 executes various processes such as calculation in accordance with instructions programed in the ROM or the like. FIG. 2 is a block diagram showing a relationship between input and output signals of the brake ECU 70.

As shown in FIG. 2, the brake ECU 70 receives detection signals from wheel speed sensors 71 to 74, which is respectively provided at each wheel FL, RR, RL, FR, a steering angle sensor 75, a yaw rate sensor 76 and a lateral acceleration (lateral gravity) sensor 77 to obtain various types of physical values. For example, the brake ECU 70 obtains the wheel speed of each wheel FL, RR, RL, FR, the vehicle speed (estimated vehicle speed), the steering angle depending on the operation amount of the steering by the driver, the actual yaw rate occurring to the vehicle, and the lateral gravity. In accordance with the above-described information, the brake ECU 70 determines whether or not ESC should be operated and further determines which wheel should be controlled under ESC. Furthermore, a control amount, i.e., the W/C pressure applied to the W/C of each controlled wheel is determined on the basis of the information. Then, the brake ECU 70 controls the current supply to the control valves 16, 17, 18, 21, 22, 36, 37, 38, 41 and 42 and the amount of the current flowed into the motor 60 for driving the pumps 19 and 39 based on the results of the above-described processes.

For example, when the W/C pressure is to be generated for a controlled wheel, the front-left wheel FL in this case, the first pressure difference control valve 16 is brought into the pressure difference generating state and the motor relay 61 is turned on to drive the pump 19 by means of the motor 60. Thus, the brake fluid pressure becomes higher at the downstream of the first pressure difference control valve 16 (the W/C side) due to the pressure difference generated by the first pressure difference control valve 16. At that time, the second pressure increasing control valve 18 corresponding to a non-controlled wheel, the rear right wheel RR in this case, is brought into the fluid communication interrupting state to prevent the W/C 15 from being pressurized, and the current is controlled (for example, by the duty ratio) or is not flowed into the first pressure increasing control valve 17 corresponding to the controlled wheel, i.e. the front left wheel FL. The operation enables the desired W/C pressure to be generated for the W/C 14.

The motor 60 also drives the pump 39. However, the brake fluid only circulates and the W/Cs 34 and 35 are not pressurized unless the second pressure difference control valve 36 is ill the pressure difference generating state.

The brake control system 1 of the embodiment is configured as just described. Next, the operation of the brake control system 1 will be described in detail. In the brake control system 1, not only the normal brake operation but also Anti Lock Brake System (ABS) and the like may be performed as the motion control. However, basic operations of these systems are similar to those of the known systems, and therefore operations of the brake control system 1 for ESC only will be described.

Figure 3:
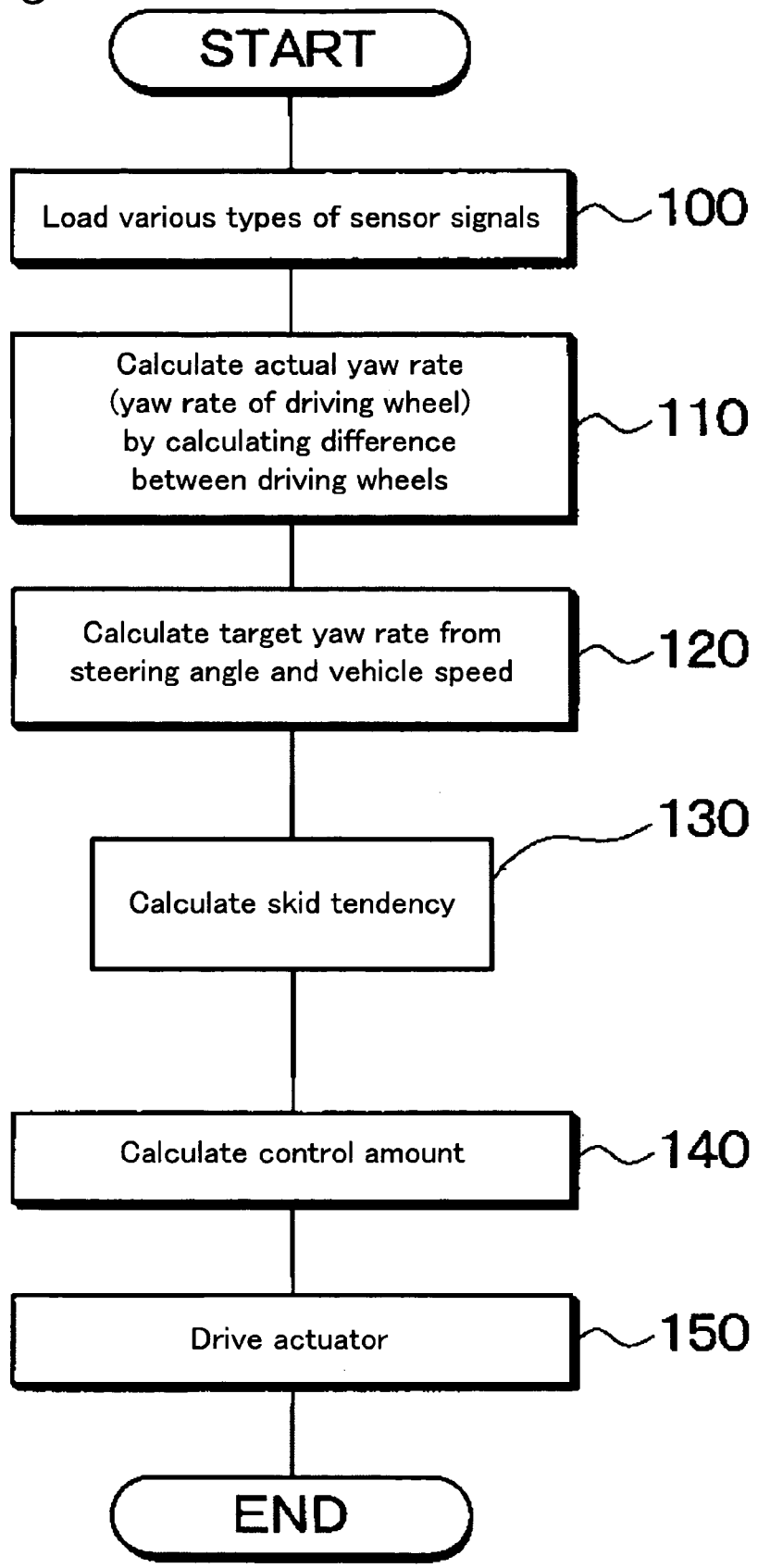
FIG. 3 is a flowchart showing steps of electronic stability control.

FIG. 3 is a flowchart showing steps for ESC, and the steps are executed by the brake ECU 70. ESC is operated when an ignition switch (not shown) provided at the vehicle is turned on, or at a predetermined operation period during operation of the vehicle.

First, the signals of each sensor are loaded in Step 100. More specifically, various types of detection signals and the like, which are necessary for operating ESC, are loaded from each wheel speed sensor 71, 72, 73, 74, the steering angle sensor 75, the yaw rate sensor 76 and the like, and each physical value is obtained from the loaded data. Accordingly, the wheel speed of each wheel FL, RR, RL, FR and the vehicle speed (estimated vehicle speed) and the steering angle are obtained.

Next, the actual yaw rate occurring at the vehicle is obtained by calculating a difference between the vehicle wheel speeds of the rear-left wheel RL and the rear-right wheel RR, which are driving wheels, in Step 110. For example, in the case that the wheel speeds of the rear-left wheel RL and the rear-right wheel RR are represented as VwRL and VwRR respectively and the distance (tread) between the rear-left wheel RL and the rear-right wheel RR is represented as tread r, the actual yaw rate is calculated by dividing the difference between the one wheel speed, VwRL, and the other wheel speed, VwRR, by the tread r.

Meanwhile, the wheel speed VwRL of the rear-left wheel RL is slower than the wheel speed VwRR of the rear-right wheel RR when turning the vehicle to left and the situation is reversed when turning the vehicle to right. Thus, the difference obtained by subtracting the wheel speed VwRR from the wheel speed VwRL should be a positive number when turning the vehicle to left, and the difference should be a negative number when turning the vehicle to right.

Subsequently, a target yaw rate is calculated in Step 120. Specifically, the target yaw rate is calculated by a known method using the data such as the steering angle determined based on the detection signal of the steering angle sensor 75, the vehicle speed, the lateral gravity determined based on the detection signal of the lateral gravity sensor 77, or the like.

Thereafter, the routine proceeds to Step 130, and an absolute value of the difference between the actual yaw rate obtained in Step 110 and the target yaw rate obtained in Step 120 is determined. The absolute value indicates a skid tendency.

Then, the routine proceeds to Step 140 and the control amount is calculated using the skid tendency obtained in Step 130. The control amount calculation is performed for determining the control amount corresponding to a braking force that should be generated to each controlled wheel for skid control, i.e. the current amount (for example, duty ratio, i.e. the ratio of the energized time to unit time) that is to be flowed into the control valves 16 to 18, 21, 22, 36 to 38, 41, 42 and the motor 60 in order to generate the target W/C pressure required for the braking force and the like. The control amount (current amount) is determined depending on the skid tendency. For example, the control amount is determined based on a map and a calculation formula, which are pre-stored in the brake ECU 70. Further, the current amount of the motor 60 varies depending on a frictional coefficient of a road surface. When the frictional coefficient of the road surface is smaller than the threshold value the current amount of the motor 60 is reduced for reducing the driving amount of the pump, compared to when the frictional coefficient of the road surface is large, i.e. when the frictional coefficient of the road surface is larger than or equal to the threshold value. The specific method for varying the amount of the current flowed into the motor 60 depending on the frictional coefficient of the road surface is known, thus details of the method is omitted here.

The setting of the controlled wheel(s) is performed based on the driver's intended direction (i.e. right turn or left turn) and whether the vehicle oversteers (OS) or understeers (US). In order to determine whether the vehicle oversteers or understeers, the target yaw rate and the actual yaw rate are compared, and the steering condition is determined based on which one is larger than the other. For example, when the vehicle oversteers, the front and rear wheels of the outside wheels, relative to the user's intended direction, are set as the controlled wheels. When the vehicle understeers, the front and rear wheels of the inside wheels, relative to the user's intended direction, are set as the controlled wheels. The braking force is generated to the wheel(s) selected as described above. In either case, the front wheel, the rear wheel, or both wheels is (are) selected as the controlled wheel(s) based on the level of the actual yaw rate, the steering angle, and the steering angle speed.

The routine proceeds to Step 150 to execute an actuator driving process. The actuator driving process is executed for generating the braking force to each controlled wheel under ESC. The current supply to the control valves 16 to 18, 21, 22, 36 to 38, 41, and 42, and the amount of the current flowed into the motor 60, used for driving the pumps 19 and 39, are controlled in this step. Thus, the pressure is automatically supplied to the W/C corresponding to each controlled wheel, out of the W/Cs 14, 15, 34, and 35 thereby generating the braking force for the skid control.

Figure 4:
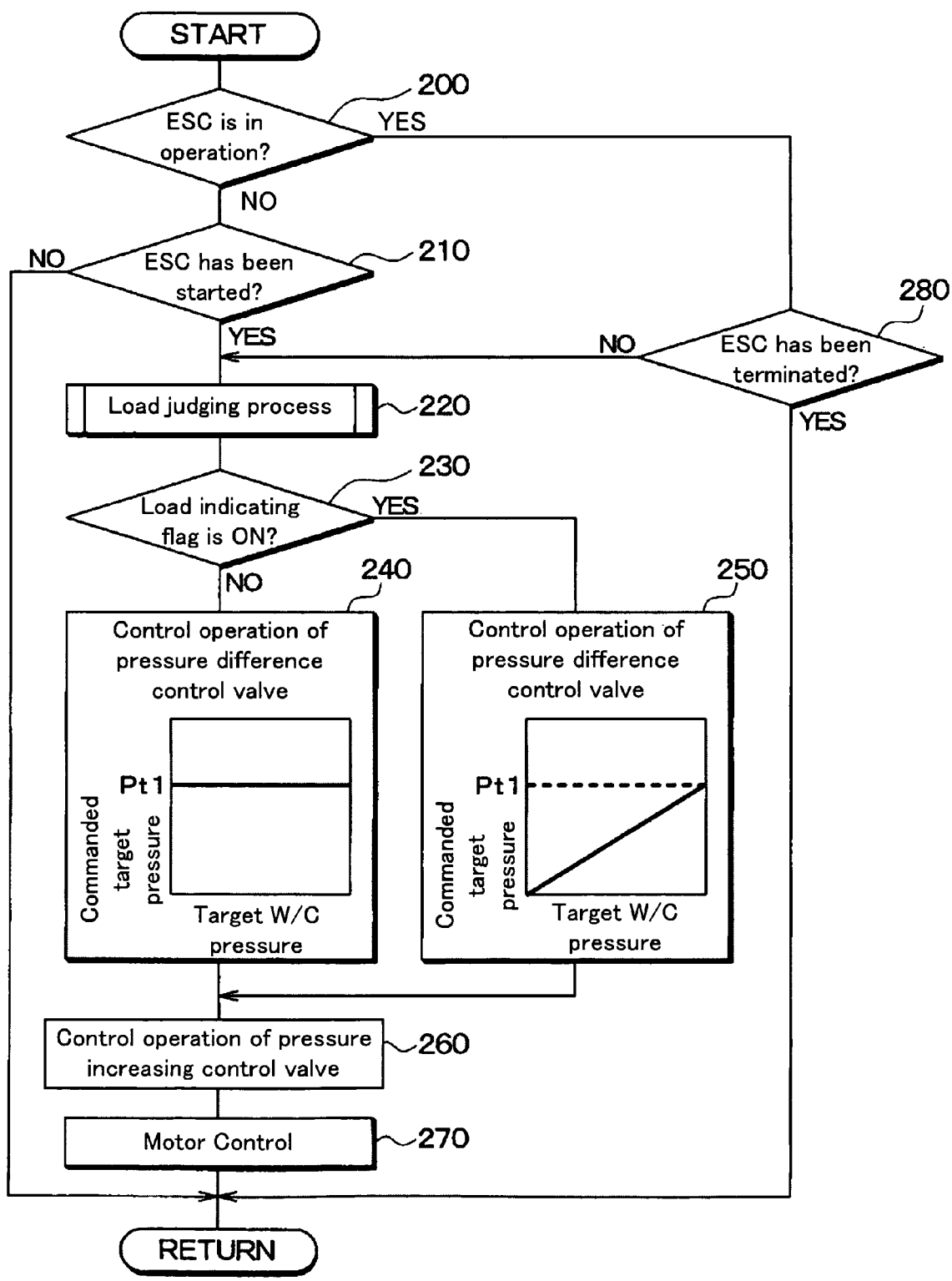
FIG. 4 is a flowchart showing steps of a pressure difference setting process.

Meanwhile, a pressure difference setting process, described in the following section, is executed for each controlled wheel. FIG. 4 is a flowchart showing steps of the pressure difference setting process. The steps are executed when the ignition switch (not shown) provided at the vehicle is turned on or at a predetermined operation period during the operation of the vehicle. The respective steps shown in FIG. 4 correspond to means for executing various types of processes.

Figure 5:
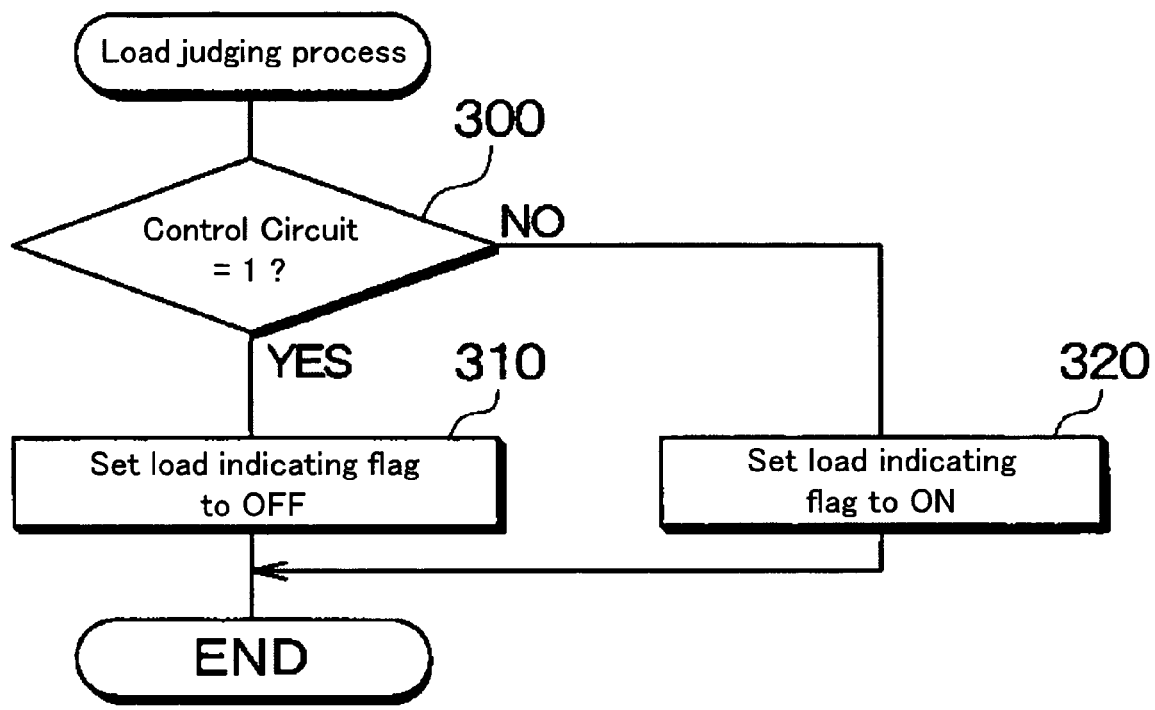
FIG. 5 is a flowchart showing steps of a load judging process.

First, whether or not ESC is in operation is judged in Step 200. In the case that a flag indicating that ESC is in operation (hereinafter, referred to as ESC flag) is activated, the affirmative judgment is made in this step (Step 200) to proceed to Step 280. In Step 280, whether or not ESC has been terminated is judged. If the skid tendency does not exceed a starting threshold value, whether or not ESC has started is judged in Step 210. In Step 210, the start of ESC is judged based on whether the slid tendency obtained in Step 130 exceeds the starting threshold value. In the case that the affirmative judgment is made in Step 210, it is assumed that the vehicle is skidding. In this case, the ESC flag is activated. Then, the routine proceeds to Step 220 to execute a load judging process for judging whether or not the load imposed on the motor 60 is large. FIG. 5 is a flowchart showing steps of the load judging process according to the embodiment, and the process will be described with reference to FIG. 5. On the other hand, if the skid tendency does not exceed the starting threshold value in Step 210, the process is terminated.

First, whether or not one control circuit includes the controlled wheel(s) is judged in Step 300. The controlled wheel(s) is (are) set in Step 140 shown in FIG. 3. The amount of the load imposed on the motor 60 differs between when either one of the first and second brake circuits 50a and 50b includes the controlled wheel(s) and when both the brake circuits 50a and 50b include the controlled wheels. The load imposed on the motor 60 becomes larger when both the brake circuits include the controlled wheels, compared to when only one brake circuit includes the controlled wheel(s).

For example, only the front left wheel FL is set as the controlled wheel, the brake fluid pressure becomes high at the downstream of the first pressure difference control valve 16 in the first brake circuit 50a. Thus, the pump 19 further supplies the brake fluid to a high pressure area, and the pump 39 supplies the brake fluid to a low pressure area. Accordingly, the load imposed on the motor 60 becomes relatively small, and loud operating noise of the pumps 19 and 39 is unlikely to occur. By contrast, when the rear left and right wheels RL and RR are set as the controlled wheels, the brake fluid pressures become high at the downstream of the first pressure difference control valve 16 in the first brake circuit 50a and the downstream of the second pressure difference control valve 36 in the second brake circuit 50b. Thus, both the pumps 19 and 39 further discharge the brake fluid to the high pressure areas, respectively. Consequently, the load imposed on the motor 60 becomes relatively large and the operating noise of the pumps 19 and 39 becomes relatively louder than when one circuit includes the controlled wheel(s).

Hence, when only one control circuit includes the controlled wheel(s) in Step 300, the load imposed on the motor 60 is judged to be not significantly large, and the routine proceeds to Step 310 to set the flag, indicating that a large load is imposed on the motor 60, (hereinafter, referred to as load indicating flag) to OFF and terminate the process. On the other hand, when the two control circuits (not one control circuit) include the controlled wheels, the load imposed on the motor 60 is judged to be large and the routine proceeds to Step 320 to set the load indicating flag to ON and terminate the process.

After the load judging process is executed in the way described above, the routine proceeds to Step 230 shown in FIG. 4 to judge whether or not the load indicating flag is set to ON. If the load indicating flag is not set to ON in Step 230, the routine proceeds to Step 240. Otherwise, the routine proceeds to Step 250.

In Step 240, a commanded target pressure is set to a constant value relative to the target W/C pressure. The commanded target pressure is a pressure difference to be generated by the pressure difference control valve, of the first and second pressure difference control valves 16 and 36, disposed at the brake circuit to which each controlled wheel is connected. As described above, in the case that one control circuit includes the controlled wheel(s), the load of the motor is not significantly large. Thus, the pressure difference is set to the normal constant value (Pt1) without reducing the pressure difference to be generated by the pressure difference control valve.

On the other hand, in Step 250, the constant (Pt1) is set as a maximum value of each commanded target pressure, i.e. the pressure difference to be generated by each of the first and second pressure difference control valves 16 and 36, and each commanded target pressure is set so as to increases in proportion to the target W/C pressure. As described above, in the case that the two control circuits include the controlled wheels, the load of the motor 60 becomes large (high load condition). Thus, the pressure differences to be generated by the first and second pressure difference control valves 16 and 36 are set so as to be lower than the constant value (Pt1), thereby reducing the brake fluid pressure around the outlet ports of the pumps 19 and 39 to reduce the load of the motor 60. Hence, the pumps 19 and 39 discharge the brake fluid to non high pressure areas and the operating noise of the pumps 19 and 39 is reduced.

After the commanded target pressures are respectively set for the first and second pressure difference control valves 16 and 36, the routine proceeds to Step 260. In Step 260, the amount of the current (duty ratio) flowed into the pressure increasing control valve corresponding to each controlled wheel is calculated by performing the control operation of the pressure increasing control valve. The amount of the current flowed into the pressure increasing control valve has been obtained in Step 140 shown in FIG. 3. However, the amount of the current may be modified in accordance with a change in the skid tendency or the setting method of the commanded target pressure to be generated by each of the first and second pressure difference control valves 16 and 36 as observed in Step 250, and thus the amount of the current is recalculated in this step. However, the value obtained in Step 140 may be used without being recalculated.

The routine then proceeds to Step 270. In order to drive the motor 60, the On/Off status of the motor relay 61 is controlled in accordance with the result of Step 140 in FIG. 3 for controlling the amount of the current (duty ratio) flowed to the motor 60.

Meanwhile, in Step 280, the termination of ESC may be judged based on whether the skid tendency obtained in Step 130 is lower than a terminating threshold value. When the skid tendency is lower than the terminating threshold value, it is assumed that the vehicle stops skidding. In this case, the ESC flag is deactivated and the process is terminated. Otherwise, further processes will be executed from Step 220.

As described above, in the embodiment, the condition of the load imposed on the motor 60 is judged based on whether the number of the control circuit including the controlled wheel(s) is one or two. If one control circuit is used, the load imposed on the motor 60 is judged to be not significantly large. In that case, the pressure difference to be generated by the pressure difference control valve disposed at the brake circuit including the controlled wheel(s), out of the first and second pressure difference control valves 16 and 36, is set to the constant value (Pt1) regardless of whether the target W/C pressure is small or not. On the other hand, if the two control circuits are used, the load imposed on the motor 60 is judged to be large. Then, the constant value (Pt1) is set to the maximum value of each pressure difference to be generated by the first and second pressure difference control valves 16 and 36, and the pressure difference is set so as to increase in proportion to the target W/C pressure.

Accordingly, if the load imposed on the motor 60 is judged to be in the high load condition, the load may be controlled to be small. When the frictional coefficient of the road surface is smaller than the threshold value, the driving amount of the pumps 19 and 39 is reduced by controlling the amount of the current flowed into the motor 60 for reducing the operating noise of the pumps 19 and 39. Even in the situation, the brake fluid pressure do not become very high around the outlet ports of the pumps 19 and 39, and thus the driving of the pumps 19 and 39 is not restrained. Therefore, the pumps 19 and 39 supply the brake fluid smoothly to increase the W/C pressure to reach the target W/C pressure.

In the embodiment, the constant value (Pt1) is set to the maximum value of each pressure difference to be generated by the first and second pressure difference control valves 16 and 36, and the pressure difference is set so as to increase in proportion to the target W/C pressure. Thus, the pressure differences to be generated by the first and second pressure difference control valves 16 and 36 may be set with increased flexibility to correspond to the target W/C pressure more accurately. As a result, ESC is operated more stably.

Second Embodiment

A second embodiment of the present invention will be described. In the second embodiment, the modification is made to the first embodiment with regard to the setting method of the commanded target pressures of the first and second pressure difference control valves 16 and 36 under ESC and the control mode of the pressure increasing control valves corresponding to the controlled wheels, which is associated with the change in the setting method. The other configuration of the brake control system 1 is identical to that of the first embodiment, and thus the description focuses on the portion which differs from the first embodiment.

Figure 6:
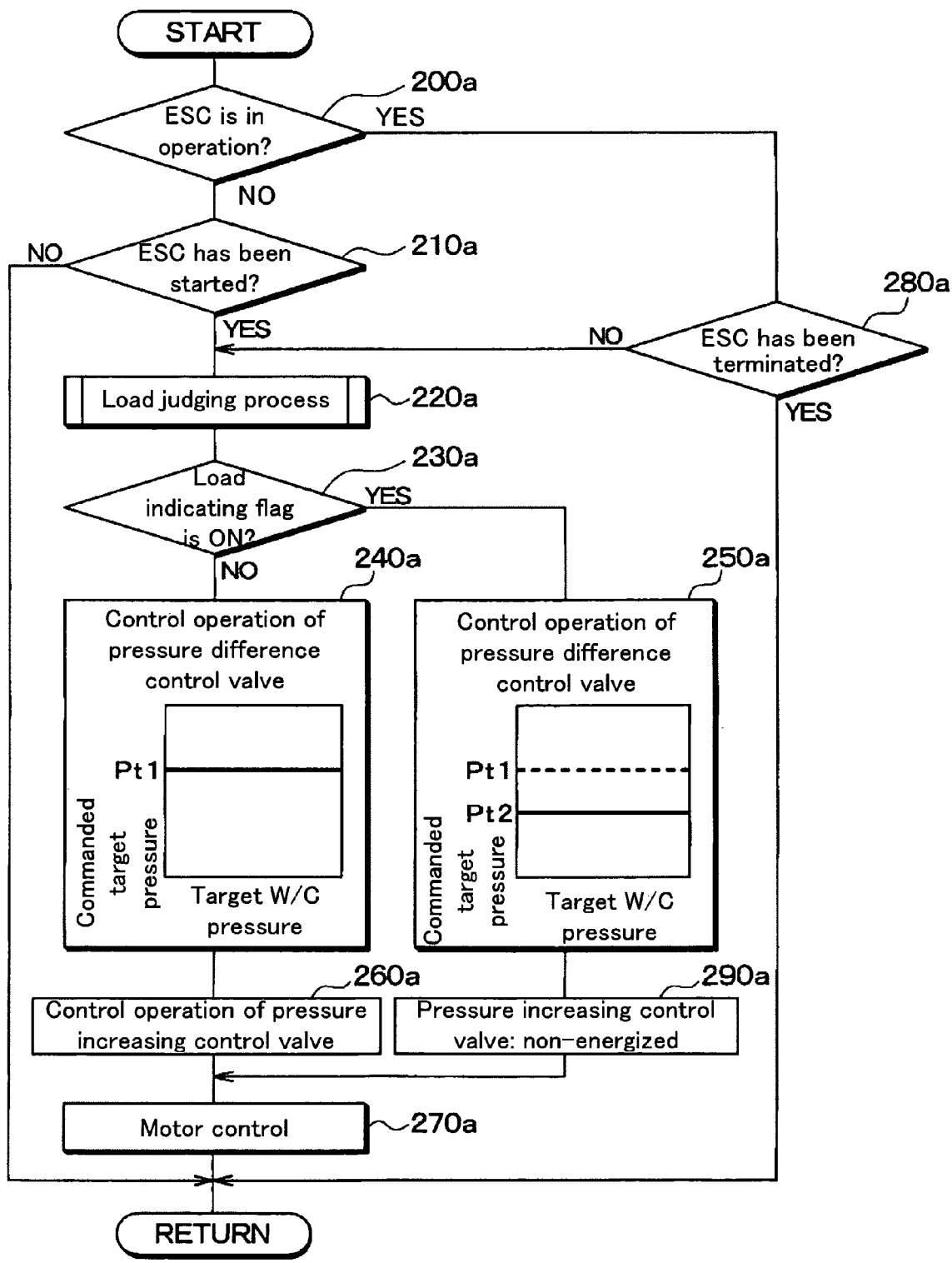
FIG. 6 is a flowchart showing steps of electronic stability control described in a second embodiment of the invention.

FIG. 6 is a flowchart showing steps of ESC according to the second embodiment. Steps 200a to 240a and Steps 260a to 280a in FIG. 6 correspond to Steps 200 to 240 and Steps 260 to 280 in FIG. 4, respectively.

In the embodiment, as shown in FIG. 6, the modification is made to the processes of ESC according to the first embodiment shown in FIG. 3 to modify the process for setting the commanded target pressures of the first and second pressure difference control valves 16 and 36 in Step 250a. Additionally, Step 290a is added.

Specifically, in the embodiment, as shown in Step 250a of FIG. 6, each commanded target pressure of the first and second pressure difference control valves 16 and 36 is set to a constant value (Pt2), which is smaller than a constant value (Pt1) set in Step 240a, relative to the target W/C pressure. At the time, the commanded target pressure is set so as to be smaller than the commanded target pressure shown in Step 240a, which is to be generated by either of the first and second pressure difference control valves 16 and 36 when the load imposed on the motor 60 is not large.

However, in the case that the commanded target pressures axe set as described above, the pressure differences to be generated by the pressure difference control valves 16 and 36 become small uniformly, and thus the brake fluid pressures become small at the downstream of the first and second pressure difference control valves 16 and 36. For the reason, the pressure increasing control valves corresponding to the controlled wheels are de-energized, in other words, the pressure increasing control valves are opened in Step 290a to utilize the brake fluid pressures at the downstream of the first and second pressure difference control valves 16 and 36 as the W/C pressure of the respective controlled wheels. Thus, even if the brake fluid pressures at the downstream of the first and second pressure difference control valves 16 and 36 are lower than those of the first embodiment, the brake fluid pressures may be utilized as the W/C pressure to increase the W/C pressure to reach the target W/C pressure smoothly.

In the embodiment, when the large load is imposed on the motor 60, the pressure differences to be generated by the first and second pressure difference control valves 16 and 36 are set so as to be uniformly small and the pressure increasing control valve corresponding to each controlled wheel is de-energized, in other words, the pressure increasing control valve is opened. Alternatively, the energization of each pressure increasing control valve may be controlled by the duty ratio. However, as described above, the brake fluid pressures at the downstream of the first and second pressure difference control valves 16 and 36 are likely to lower, thus the duty ratio should be set to a low level for maintaining the opening of the pressure increasing control valves for a long time.

Third Embodiment

A third embodiment of the present invention will be described. In the third embodiment, the modification is made to the first and second embodiments to modify the load judging process of ESC. The other configuration of the brake controlling system 1 is similar to that of the second embodiment, thus the description focuses on the portion which differs from the second embodiment.

Figure 7:
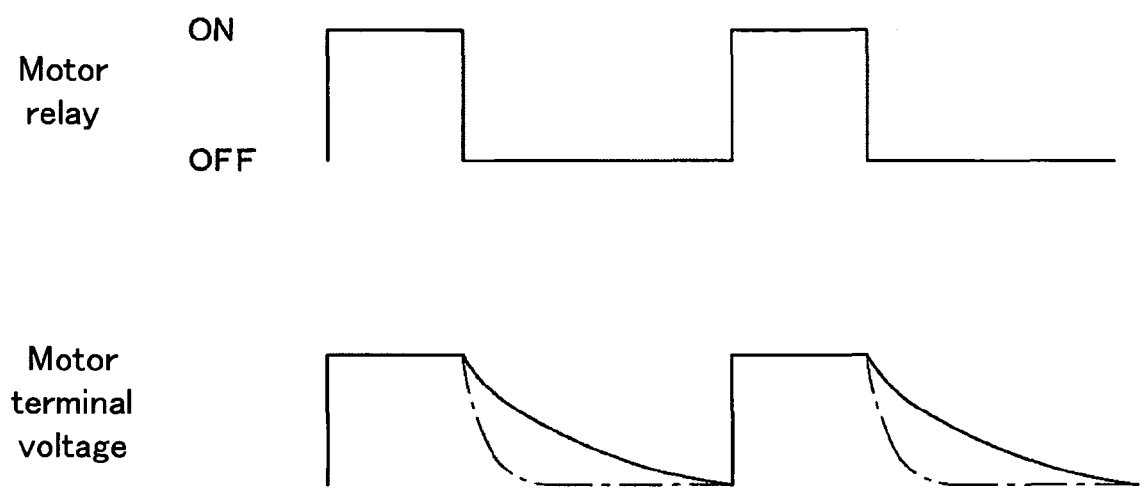
FIG. 7 is a timing chart showing ON/OFF states of a motor relay and a terminal voltage of a motor.

In the first embodiment, the condition of the load imposed on the motor 60 is judged based on whether or not one control circuit is used. In the third embodiment, the condition of the load imposed on the motor 60 is judged based on terminal voltage of the motor 60. The process will be described in more detail with reference to timing diagrams shown in FIG. 7. One timing diagram shows ON/OFF states of the motor relay 61 and the other diagram shows the terminal voltage of the motor 60.

When the amount of the current flowed into the motor 60 is controlled by the duty ratio, the ON/OFF state of the motor relay 61 is switched based on the duty ratio. When switching the motor relay 61 from the ON state to the OFF state, the terminal voltage of the motor 60 (electric potential of a connecting point P1 between the motor relay 61 and the motor 60 shown in FIG. 1) depends on a descending gradient of rotation speed of the motor 60. Namely, the terminal voltage of the motor 60 is reduced slowly when the descending gradient of the rotation speed of the motor is small. Meanwhile, the terminal voltage of the motor 60 is reduced rapidly when the descending gradient of the rotation speed is large. Further, the descending gradient of the rotation speed of the motor 60 corresponds to the load imposed on the motor 60. Thus, the larger the load becomes, the larger the descending gradient of the rotation speed of the motor 60 becomes. Therefore, the condition of the load imposed on the motor 60 may be judged based on the descending gradient of the terminal voltage of the motor 60. In the embodiment, the load judging process is executed based on the terminal voltage of the motor 60.

Figure 8:
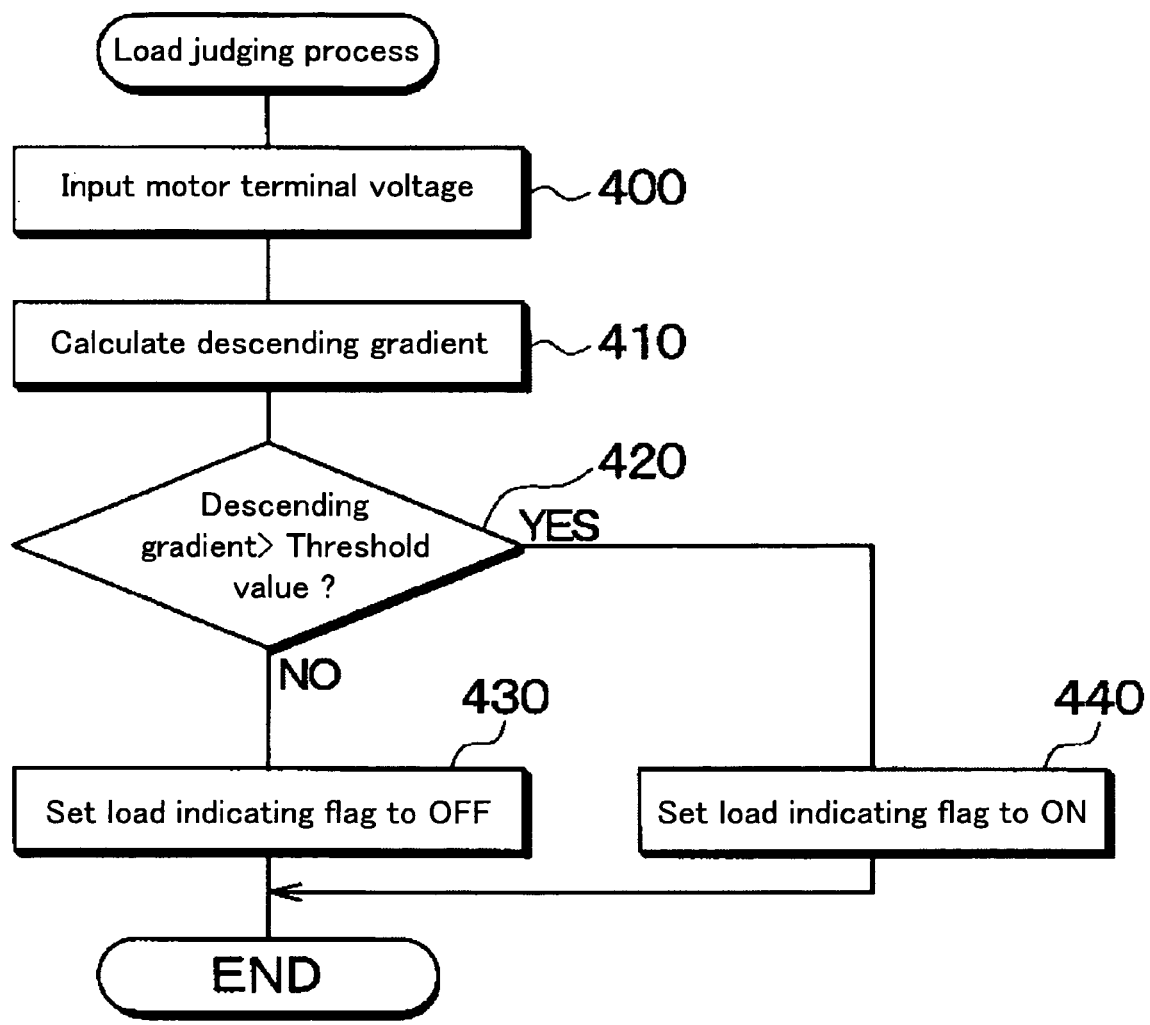
FIG. 8 is a flowchart showing steps of a load judging process described in a third embodiment of the invention.

FIG. 8 is a flowchart showing the load judging process according to the embodiment. The process corresponds to Step 220 of the first embodiment in FIG. 4 and to Step 220a of the second embodiment in FIG. 6.

Firstly, the terminal voltage of the motor 60 is input to be stored in Step 400. The step is processed by inputting the electric potential of the connecting point P1 between the motor 60 and the motor relay 61 to the brake ECU 70. Next, the descending gradient of the terminal voltage of the motor 60 is calculated in Step 410. For instance, the descending gradient is obtained by calculating a difference between the previous terminal voltage of the motor 60 input in the previous operating cycle and the current terminal voltage of the motor 60 input in the current operating cycle.

Subsequently, whether or not the descending gradient of the terminal voltage of the motor 60 is lower than a threshold value is judged in Step 420. The steeper the descending gradient becomes, the larger the load imposed on the motor 60 becomes. Thus, the threshold value is set to a value indicating that a large load imposed on the motor 60, and the load is judged to be large (high load condition) when the descending gradient is larger than the threshold value.

Accordingly, when the descending gradient is judged to be larger than or equal to the threshold value in Step 420, the routine proceeds to Step 430. Then, the load indicating flag is set to OFF and the process is terminated. On the other hand, when the descend gradient is judged to be lower than the threshold value, the routine proceeds to Step 440. Then, the load indicating flag is set to ON and the process is terminated.

As just described, the load judging process may be executed based on the terminal voltage of the motor 60, and the modified load judging process should generate effects similar to those of the first embodiment.

Fourth Embodiment

A fourth embodiment of the invention will be described. In the fourth embodiment, similarly to Step 250a of the second embodiment in FIG. 6, the commanded target pressure is set to a constant value relative to the target W/C pressure. Further, the load judging process adopted in the third embodiment is executed and the commanded target pressure of each pressure difference control valve is set based on the descending gradient of the terminal voltage of the motor 60. The other configuration is similar to that of the third embodiment.

Figure 9:
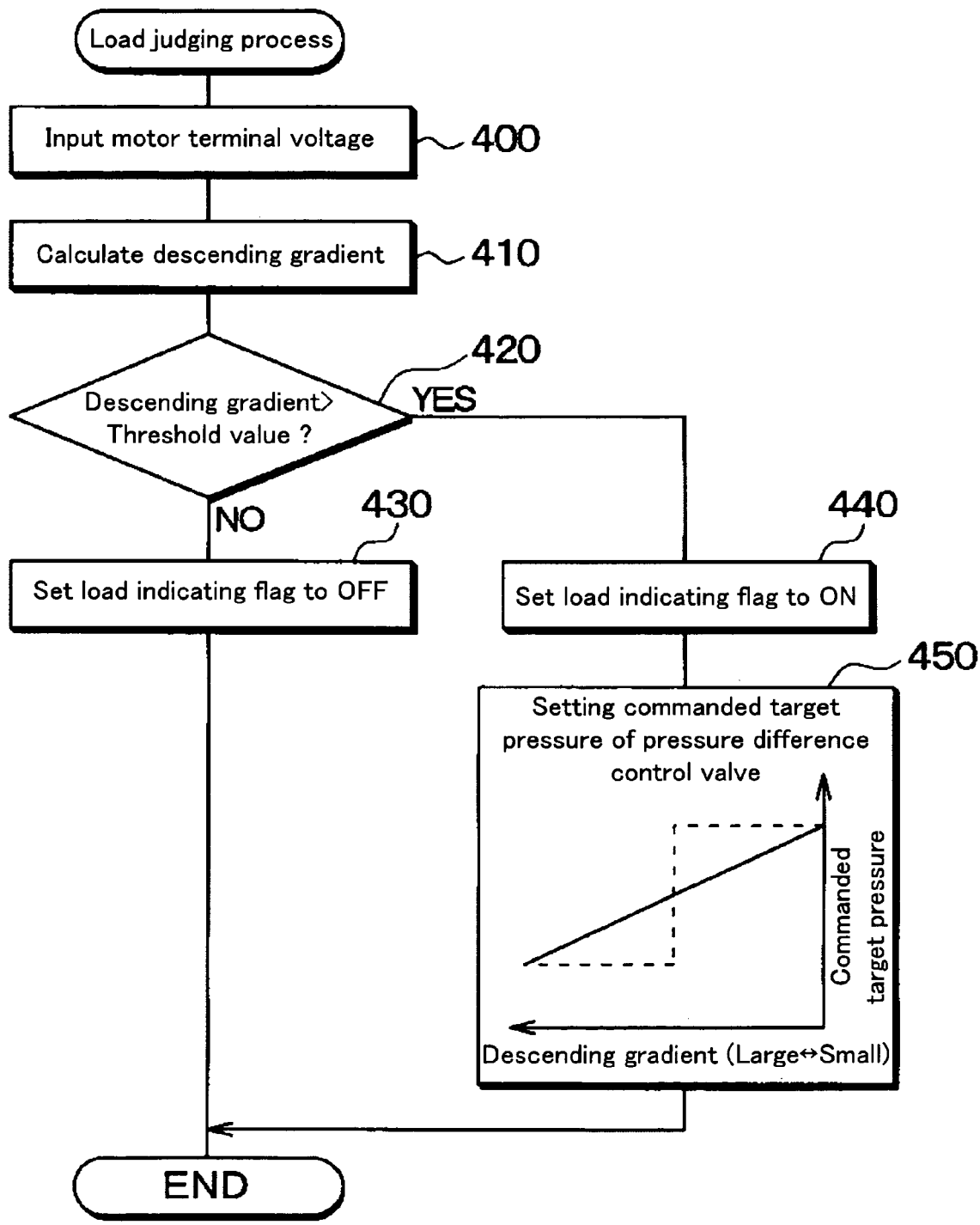
FIG. 9 is a flowchart showing steps of a load judging process described in a fourth embodiment of the invention.

FIG. 9 is a flowchart showing steps of the load judging process according to the embodiment. The process corresponds to the load judging process of the second embodiment in FIG. 6.

The load judging process is executed in Steps 400 to 440 in a similar way to the third embodiment shown in FIG. 8. If the load imposed on the motor 60 is judged to be large in Step 430, the commanded target pressure of each pressure difference control valve is set based on the descending gradient of the terminal voltage of the motor 60 in Step 450.

Specifically, the commanded target pressure is set to maintain the relationship between the descending gradient and the commanded target pressure as shown in a map in Step 450. In other words, the larger (steeper) the descending gradient becomes, the smaller the commanded target pressure becomes. The commanded target pressure may be descended linearly as indicated by a solid line, or may be descended stepwisely as indicated by a dashed line. The commanded target pressure is set as just described to be used as a value of the commanded target pressure shown in the map, which shows the relationship between the commanded target pressure and the target W/C pressure, in Step 250a of the second embodiment shown in FIG. 6.

The commanded target pressure of each pressure difference control valve is set based on the descending gradient of the terminal voltage of the motor 60 in this way, thereby setting the commanded target pressure to a value corresponding to the load imposed on the motor 60. Therefore, ESC is operated more stably.

Fifth Embodiment

A fifth embodiment of the invention will be described. In the fifth embodiment, the modification is made to the first and second embodiments to modify the load judging process of ESC. The other configuration of the brake control system 1 is similar to that of the first embodiment, and thus the description focuses on the portion which differs from the first embodiment.

In the embodiment, the condition of the load imposed on the motor 60 is judged based on the duty ratio, i.e., the ratio of the energized time to unit time, of the pressure increasing control valve corresponding to each controlled wheel. In the case that the pressure increasing control valve corresponding to each controlled wheel is controlled by the duty ratio, the higher the duty ratio becomes, the longer the fluid communication interrupting state of the pressure increasing control valve becomes, in other words, the longer the time period to maintain the W/C pressure becomes. The longer the time period to maintain the W/C pressure becomes, the more likely the brake fluid pressures at the downstream of the first and second pressure difference control valves 16, 36 become high. Therefore, the condition of the load imposed on the motor 60 is judged by the duty ratio of the pressure increasing control valve corresponding to each controlled wheel. In the embodiment, the load judging process is executed based on the duty ratio of the pressure increasing control valve corresponding to each controlled wheel.

Figure 10:
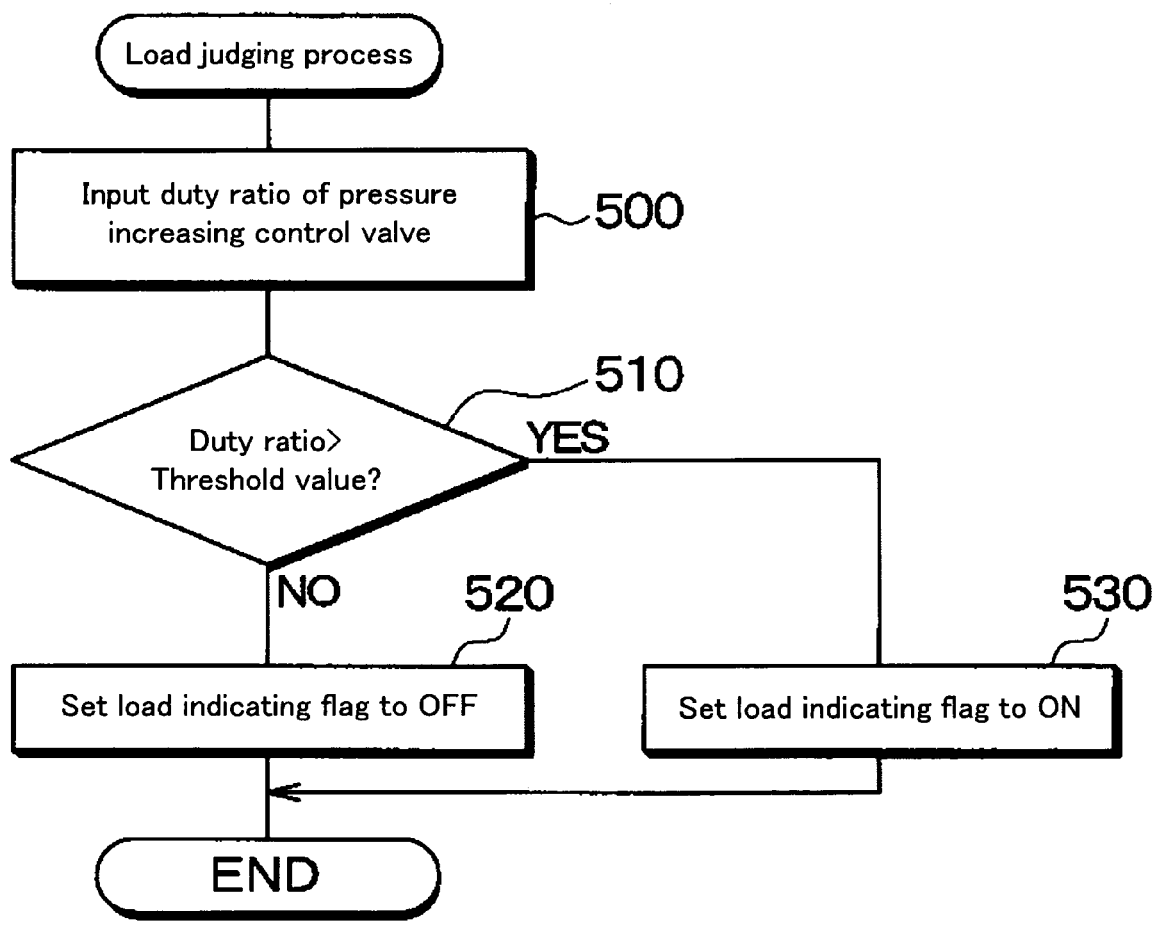
FIG. 10 is a flowchart showing steps of a load judging process described in a fifth embodiment of the invention.

FIG. 10 is a flowchart showing steps of the load judging process according to the embodiment. The process corresponds to the load judging process of the first embodiment in FIG. 4 or the second embodiment in FIG. 6.

The duty ratio of the pressure increasing control valve corresponding to each controlled wheel is input to be stored in Step 500. The value obtained in the calculation for the control amount performed in Step 140 of FIG. 3 may be used here. Alternatively, if the amount of the current flowed into the pressure increasing control valve corresponding to the controlled wheel has been obtained in Step 260 of FIG. 4, the value may be used here.

Next, whether or not the duty ratio of the pressure increasing control valve corresponding to each controlled wheel is larger than a threshold value is judged in Step 510. The threshold value is set to a value indicating the load imposed on the motor 60 is large. Hence, when the duty ratio of the pressure increasing control valve corresponding to each controlled wheels is larger than the threshold value, the load imposed on the motor 60 is judged to be large (high load condition).

Therefore, when the duty ratio of the pressure increasing control value corresponding to the controlled wheel is judged to be smaller than or equal to the threshold value in Step 510, the routine proceeds to Step 520. Then, the load indicating flag is set to OFF and the process is terminated. On the other hand, the duty ratio of the pressure increasing control value corresponding to each controlled wheel is judged to be larger than the threshold value in Step 510, the routine proceeds to Step 530. Then, the load indicating flag is set to ON and the process is terminated.

As just described, the load judging process may be executed based on the duty ratio of the pressure increasing control valve corresponding to each controlled wheel, and the modified load judging process should generate effects similar to those of the first embodiment.

Here, the load judging process is executed based on the duty ratio of the pressure increasing control valve corresponding to each controlled wheel, however, the method is just an example to utilize the amount of the current flowed into the pressure increasing control valve in the load judging process. The load judging process may be executed based on the amount of the current itself.

Sixth Embodiment

A sixth embodiment of the invention will be described. In the sixth embodiment, similarly to Step 250*a* of the second embodiment in FIG. 6, the commanded target pressure is set to a constant value relative to the target W/C pressure. Further, the load judging process adopted in the fifth embodiment is executed and the commanded target pressure of each pressure difference control valve is set based on the duty ratio of the pressure increasing control valve corresponding to each controlled wheel. The other configuration is similar to that of the fifth embodiment.

Figure 11:
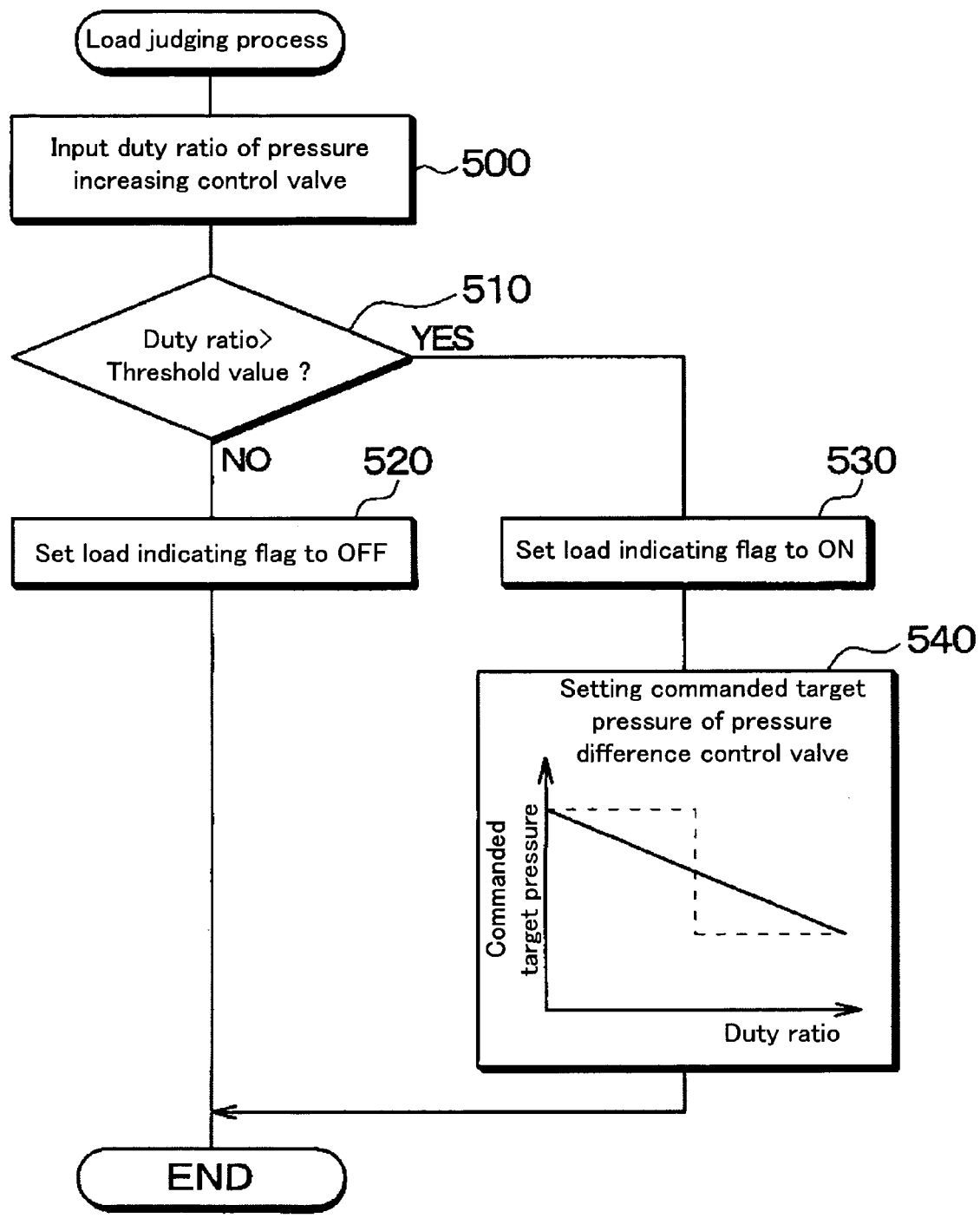
FIG. 11 is a flowchart showing steps of a load judging process described in a sixth embodiment of the invention.

FIG. 11 is a flowchart of the load judging process according to the embodiment. The process corresponds to the load judging process of the second embodiment in FIG. 6.

The load judging process is executed in Steps 500 to 530 in a similar way to the fifth embodiment shown in FIG. 10. If the load imposed on the motor 60 is judged to be large in Step 510, the commanded target pressure of the pressure difference control valve is set based on the duty ratio of the pressure increasing control valve corresponding to each controlled wheel in Step 540.

Specifically, the commanded target pressure is set to maintain the relationship between the duty ratio and the commanded target pressure as shown in a map of Step 540. In other words, the larger the duty ratio becomes, the smaller the commanded target pressure becomes. The commanded target pressure may be descended linearly as indicated by a solid line, or may be descended stepwisely as indicated by a dashed line. The commanded target pressure is set as just described to be used as a value of the commanded target pressure in the map of the second embodiment in FIG. 6 showing the relationship between the commanded target pressure and the target W/C pressure.

The commanded target pressure of the pressure difference control valve is set based on the duty ratio of the pressure increasing control valve corresponding to each controlled wheel as described above, thereby setting the commanded target pressure to a value corresponding to the amount of the load imposed on the motor 60. Therefore, ESC is operated more stably.

Other Embodiment

In each embodiment described above, one aspect of ESC is described. However, various types of processes may be replaced with well known methods, except the load judging process and the processes associated with the load judging process. For example, the target yaw rate and the actual yaw rate, both used for determining to start ESC, may be obtained by other methods.

In the third and fifth embodiments, the modification is made to the second embodiment, in which the pressure differences generated by the first and second pressure difference control valves 16 and 36 are uniformly reduced, for modifying the load judging process. The modification is made in consideration of setting the pressure differences variable as described in the fourth and sixth embodiments. In the fourth embodiment, the pressure differences generated by the pressure difference control valves 16 and 36 are set depending on the descending gradient of the terminal voltage of the motor 60 used in the load judging process. Also, the pressure differences generated by the pressure difference control valves 16 and 36 are set depending on the duty ratio of the pressure increasing control valve corresponding to each controlled wheel in the sixth embodiment. However, if the pressure differences generated by the first and second pressure difference control valves 16 and 36 are set depending on the target W/C pressure, the load judging process of the first embodiment may be executed by using the methods adopted in the third and fifth embodiments.

In each embodiment described above, a case example, showing that the operating noise of the pumps is reduced in view of the load imposed on the motor and the W/C pressure increases to reach the target W/C pressure smoothly, is described as processes of ESC serving as the vehicle motion control The same holds for TCS (Traction Control System). In that case, ESC in FIG. 4 and FIG. 6 is replaced with TCS, and the load judging processes shown in FIG. 5 and FIGS. 8 to 11 are executed. Accordingly, the operating noise of the pumps is reduced in view of the load imposed on the motor, and the W/C pressure increases to reach the target W/C pressure smoothly in TCS.

The respective steps shown in each drawing correspond to means for executing each process.

As described above, in Steps 100 to 150, each of the pumps 19 and 39 is operated for supplying the brake fluid between the pressure difference control valve 16, 36, which is disposed between the master cylinder 13 and the wheel cylinders 14, 15, 34, 35 provided corresponding to each wheel (FL, RR, RL, FR), and the corresponding pressure increasing control valve 17, 18, 37, 38 provided corresponding to each wheel cylinder 14, 15, 34, 35. Further, in those steps, the pressure difference control valves 16 and 36 are respectively controlled to generate the pressure difference between the master cylinder side and the wheel cylinder side to reach the commanded target pressure, and the corresponding pressure increasing control valve(s) 17, 18, 37, 38 is (are) also controlled, thereby pressurizing the wheel cylinder 14, 15, 34, 35 corresponding to each wheel to be controlled FL, RR, RL, FR, regardless of the driver's brake operation. Further, in Step 140, the control amount of the motor 60 driving the pumps 19 and 39 is adjusted to be small when the frictional coefficient of the road surface is smaller than the threshold value, compared to when the frictional coefficient of the road surface is large, i.e. when the frictional coefficient of the road surface is larger than or equal to the threshold value, and the load condition of the motor 60 is judged for determining to reduce the control amount of the motor 60 in Step 220. Furthermore, in Step 250, the pressure differences generated by the pressure difference control valves 16 and 36 are controlled to be small when the load imposed on the motor 60 is in a high load condition, compared to when the load imposed on the motor 60 is not large.

As described above, when the load imposed on the motor 60 is judged to be large, the load may be adjusted to be small. Thus, when the frictional coefficient of the road surface is smaller than the threshold value, even if the driving amounts of the pumps 19 and 39 are reduced by controlling the amount of the current flowed into the motor 60 for reducing the operating sound of the pumps 19 and 39, the brake fluid pressures are prevented from being very high around the outlet ports of the pumps 19 and 39. Hence, the driving of the pumps 19 and 39 is not restrained. Therefore, the pumps 19 and 39 supply the brake fluid smoothly and the W/C pressures are increased to reach the target W/C pressures.

For example, as shown in the embodiment, in the load judging process, the load condition is judged based on whether either of first and second brake circuits 50a and 50b, which connect the master cylinder 13 to the wheel cylinders 14, 15, 34 35, includes the wheel(s) to be controlled FL, RR, RL, and FR, or both the first and second brake circuits 50a and 50b include the wheels to be controlled FL, RR, RL, and FR. In that case, the load condition is judged to be in the high load condition when the wheels to be controlled FL, RR, RL, FR are included in both the first and second brake circuits 50a and 50b.

Further, according to the embodiment, the load condition is judged based on the descending gradient of the terminal voltage of the motor 60 in the load judging process. When the descending gradient is larger than the threshold value, the load is judged to be in the high load condition.

Furthermore, according to the embodiment, the amount of the current flowed into the pressure increasing control valve 17, 18, 37, 38 corresponding to each controlled wheel FL, RR, RL, FR, out of the pressure increasing control valves 17, 18, 37, 38 is used to judge the load condition in the load judging process. When the amount of the current is smaller than the threshold value, the load is judged to be in the high load condition.

Still further, according to the embodiment, the load judging means judges the load condition of the motor 60 when determining to reduce the control amount of the motor 60, and the pressure differences generated by the pressure difference control valves 16 and 36 are controlled to be small when the load imposed on the motor 60 is in the high load condition, compared to when the load imposed on the motor 60 is not in the high load condition in Step 250a, and the corresponding pressure increasing control valve 17, 18, 37, 38 of the wheel to be controlled FL, RR, RL, FR, out of the pressure increasing control valves 17, 18, 37, and 38, to open, thereby pressurizing the wheel cylinder 14, 15, 34 35, by the pressure differences generated only by the pressure difference control valves 16 and 36 in Step 290.

As described above, when the large load is imposed on the motor 60, the pressure difference generated by each pressure difference control valve 16, 36 is uniformly reduced, and the brake fluid pressure, generated in the area located close to the W/C relative to the pressure difference control valve 16, 36, may be used as the W/C pressure for each controlled wheel FL, RR, RL, FR. Even if the modification is made in this way, similar effects to those of the first embodiment will be generated. In addition, even in this case, the load condition is judged by either of the load judging processes adopted in the second to fifth embodiments.

According to the embodiment, when the load condition is judged based on the descending gradient of the terminal voltage of the motor 60, the differential pressure generated by each differential pressure controlling valve 16, 36 may be set to a value corresponding to the descending gradient in step 450.

According to the embodiment, when the amount of the current flowed into the pressure increasing control valve 17, 18, 37, 38 corresponding to the controlled wheel FL, RR, RL, FR, out of the pressure increase controlling valves 17, 18, 37, 38, is used to judge the load condition, and the pressure difference generated by the pressure difference control valve may be set to a value inversely proportional to the amount of the current in Step 540.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A vehicle motion control apparatus comprising:
a motion controlling means operating a pump for supplying brake fluid between a pressure difference control valve, which is disposed between a master cylinder and a wheel cylinder provided corresponding to each wheel, and a pressure increasing control valve disposed between the pressure difference control valve and the wheel cylinder and corresponding to each wheel cylinder, the motion controlling means controlling the pressure difference control valve to generate a pressure difference between a master cylinder side and a wheel cylinder side to reach a commanded target pressure and controlling the pressure increasing control valve, thereby pressurizing the wheel cylinder corresponding to the wheel to be controlled, irrespective of a driver's brake operation;

a control amount adjusting means adjusting a control amount of a motor driving the pump to be small when a frictional coefficient of a road surface is smaller than a predetermined value, compared to when the frictional coefficient of the road surface is larger than or equal to the predetermined value;

a load judging means judging a load condition of the motor when determining to reduce the control amount of the motor; and a pressure difference controlling means controlling the pressure difference generated by the pressure difference control valve to be small when the load imposed on the motor is in a high load condition, compared to when the load imposed on the motor is not in the high load condition.

2. A vehicle motion control apparatus according to claim 1, wherein the load judging means judges the load condition based on whether either one of first and second brake circuits, which connect the master cylinder to each wheel cylinder respectively, includes the wheel to be controlled, or both the first and second brake circuits include the wheels to be controlled, and the load is judged to be in the high load condition when the wheels to be controlled are included in both the first and second brake circuits.

3. A vehicle motion control apparatus according to claim 1, wherein the load judging means judges the load condition based on a descending gradient of a terminal voltage of the motor, and the load is judged to be in the high load condition when the descending gradient is larger than a threshold value.

4. A vehicle motion control apparatus according to claim 1, wherein the load judging means judges the load condition based on an amount of a current flowed into the pressure increasing control valve corresponding to the wheel to be controlled, and the load is judged to be in the high load condition when the amount of the current is smaller than a threshold value.

5. A vehicle motion control apparatus, comprising:

a motion controlling means operating a pump for supplying brake fluid between a pressure difference control valve, which is disposed between a master cylinder and a wheel cylinder provided corresponding to each wheel, and a pressure increasing control valve disposed between the pressure difference control valve and the wheel cylinder and corresponding to each wheel cylinder, the motion controlling means controlling the pressure difference control valve to generate a pressure difference between a master cylinder side and a wheel cylinder side to reach a commanded target pressure and controlling the pressure increasing control valve, thereby pressurizing the wheel cylinder corresponding to the wheel to be controlled, irrespective of a driver's brake operation;

a control amount adjusting means adjusting a control amount of a motor driving the pump to be small when a frictional coefficient of a road surface is smaller than a predetermined value, compared to when the frictional coefficient of the road surface is larger than or equal to the predetermined value;

a load judging means judging a load condition of the motor when determining to reduce the control amount of the motor; and a pressure controlling means controlling the pressure difference generated by the pressure difference control valve to be small when the load imposed on the motor is in a high load condition, compared to when the load imposed on the motor is not in the high load condition, and controlling the corresponding pressure increasing control valve of the wheel to be controlled, out of the pressure increasing control valves, to open, thereby pressurizing the wheel cylinder by the pressure difference generated only by the pressure difference control valve.

6. A vehicle motion control apparatus according to claim 5, wherein the load judging means judges the load condition based on whether either one of first and second brake circuits, which connect the master cylinder to each wheel cylinder respectively, includes the wheel to be controlled or both the first and second brake circuits include the wheels to be controlled, and the load is judged to be in the high load condition when the wheels to be controlled are included in both the first and second brake circuits.

7. A vehicle motion control apparatus according to claim 5, wherein the load judging means judges the load condition based on a descending gradient of a terminal voltage of the motor, and the load is judged to be in the high load condition when the descending gradient is larger than a threshold value.

8. A vehicle motion control apparatus according to claim 7, wherein the pressure controlling means sets the pressure difference generated by the pressure difference control valve to a value corresponding to the descending gradient.

9. A vehicle motion control apparatus according to claim 5, wherein the load judging means judges the load condition based on an amount of a current flowed into the pressure increasing control valve corresponding to the wheel to be controlled, and the load is judged to be in the high load condition when the amount of the current is smaller than a threshold value.

10. A vehicle motion control apparatus according to claim 9, wherein the pressure controlling means sets the pressure difference generated by the pressure difference control valve to a value inversely proportional to the amount of the current.

11. A method for vehicle motion control comprising the steps of (a) operating a pump for supplying brake fluid between a pressure difference control valve, which is disposed between a master cylinder and a wheel cylinder provided corresponding to each wheel, and a pressure increasing control valve disposed, between the pressure difference control valve and the wheel cylinder and corresponding to each wheel cylinder, controlling the pressure difference control valve to generate a pressure difference between a master cylinder side and a wheel cylinder side to reach a commanded target pressure and controlling the pressure increasing control valve, thereby pressurizing the wheel cylinder corresponding to the wheel to be controlled, irrespective of a driver's brake operation;

(b) adjusting a control amount of a motor driving the pump to be small when a frictional coefficient of a road surface is smaller than a predetermined value, compared to when the frictional coefficient of the road surface is larger than or equal to the predetermined value;

(c) judging a load condition imposed on the motor when determining to reduce the control amount of the motor; and (d) controlling the pressure difference generated by the pressure difference control valve to be small when the load imposed on the motor is in a high load condition, compared to when the load imposed on the motor is not in the high load condition, and controlling the corresponding pressure increasing control valve of the wheel to be controlled, out of the pressure increasing control valves, to open, thereby pressurizing the wheel cylinder by the pressure difference generated only by the pressure difference control valve.

12. A method for vehicle motion control according to claim 11, wherein in step (c), the load condition is judged based on whether either one of first and second brake circuits, which connect the master cylinder to each wheel cylinder respectively, includes the wheel to be controlled or both the first and second brake circuits include the wheels to be controlled, and the load is judged to be in the high load condition when the wheels to be controlled are included in both the first and second brake circuits.

13. A method for vehicle motion control according to claim 11, wherein in step (c), the load condition is judged based on a descending gradient of a terminal voltage of the motor, and the load is judged to be in the high condition when the descending gradient is larger than a threshold value.

14. A method for vehicle motion control according to claim 13, wherein in step (d), the pressure difference generated by the pressure difference control valve is set to a value corresponding to the descending gradient.

15. A method for vehicle motion control according to claim 11, wherein in step (c), the load condition is judged based on an amount of a current flowed into the pressure increasing control valve corresponding to the wheel to be controlled, and the load is judged to be in the high condition when the amount of the current is smaller than a threshold value.

16. A method for vehicle motion control according to claim 15, wherein in step (d), the pressure difference generated by the pressure difference control valve is set to a value inversely proportional to the amount of the current.

* * * * *